US012746875B2

(12) United States Patent
Sobhany

(10) Patent No.: US 12,746,875 B2
(45) Date of Patent: Sep. 29, 2026

(54) REAL-TIME CONTEXTUAL VEHICLE LIGHTING SYSTEMS AND METHODS

(71) Applicant: Cobalt Industries Inc., San Francisco, CA (US)

(72) Inventor: Rana June Sobhany, Lakewood Ranch, FL (US)

(73) Assignee: Cobalt Industries Inc., San Francisco, CA (US)

( * ) Notice: Subject to any disclaimer, the term of this patent is extended or adjusted under 35 U.S.C. 154(b) by 0 days.

(21) Appl. No.: 17/181,863

(22) Filed: Feb. 22, 2021

(65) Prior Publication Data

US 2021/0261050 A1 Aug. 26, 2021

Related U.S. Application Data

(60) Provisional application No. 62/980,142, filed on Feb. 21, 2020.

(51) Int. Cl.

| | |
|---|---|
| ***B60Q 3/85*** | (2017.01) |
| ***B60W 40/08*** | (2012.01) |
| ***B60W 40/09*** | (2012.01) |
| ***B60W 50/14*** | (2020.01) |

(52) U.S. Cl.

CPC ............... *B60Q 3/85* (2017.02); *B60W 40/09* (2013.01); *B60W 50/14* (2013.01); *B60W 2040/0872* (2013.01); *B60W 2540/221* (2020.02); *B60W 2540/229* (2020.02); *B60W 2540/26* (2013.01)

(58) Field of Classification Search

CPC ........... B60Q 3/85; B60Q 3/80; B60W 40/09; B60W 50/14; B60W 2040/0872; B60W 2540/221; B60W 2540/229; B60W 2540/26

See application file for complete search history.

(56) References Cited

U.S. PATENT DOCUMENTS

| | | | | |
|---|---|---|---|---|
| 2015/0062941 | A1* | 3/2015 | Sura | B60Q 3/80 362/488 |
| 2018/0086259 | A1* | 3/2018 | Bel | B60Q 3/60 |
| 2018/0118218 | A1* | 5/2018 | Miloser | B60W 50/14 |
| 2019/0104593 | A1* | 4/2019 | Aliakseyeu | G06F 16/7834 |
| 2019/0213429 | A1* | 7/2019 | Sicconi | G06F 3/012 |
| 2019/0232974 | A1* | 8/2019 | Reiley | A61B 5/165 |
| 2020/0346598 | A1* | 11/2020 | Boston | G06F 8/65 |

OTHER PUBLICATIONS

Mindtree, Rights and Metadata management for media, May 4, 2020.*

* cited by examiner

*Primary Examiner* — Ig T An
(74) *Attorney, Agent, or Firm* — KPPB LLP

(57) ABSTRACT

A vehicle includes an internal lighting system with a plurality of lighting devices, which is capable of outputting different lighting configurations. Each lighting configuration is defined by a brightness of emitted light, a color of emitted light, a number and identity of the plurality of lighting devices that are turned on, and/or a time-based sequence of changes to the brightness or color of one or more of the plurality of lighting devices. The vehicle further includes one or more sensors and a processor communicatively coupled to the lighting system and the sensors. The processor causes the lighting system to output a first lighting configuration. Based on data captured by the sensors, the processor detects a trigger criterion has been satisfied. In response to detecting the satisfaction of the trigger criterion, the processor modifies a configuration of the lighting system to output a second lighting configuration.

20 Claims, 8 Drawing Sheets

REAL-TIME CONTEXTUAL VEHICLE LIGHTING SYSTEMS AND METHODS

CROSS-REFERENCE TO RELATED APPLICATION

This application claims the benefit of U.S. Provisional Patent Application No. 62/980,142, filed Feb. 21, 2020, which is incorporated herein by reference in its entirety.

TECHNICAL FIELD

This disclosure relates to systems and methods for enabling real-time contextualized lighting in a vehicle.

BACKGROUND

Vehicles are generally utilized by individuals for transportation to various destinations. For example, a vehicle can include a car, truck, train, airplane, or boat. While vehicles are generally utilized for transportation, vehicles include components configured to perform various functionalities while a user rides inside the vehicle. However, outside of static features such as ergonomic chairs, vehicles today do little to improve the comfort and enjoyment of people riding in a vehicle. In particular, as partially or fully autonomous vehicles grow in popularity, improving users' experiences in a vehicle becomes increasingly more important.

DETAILED DESCRIPTION

Automotive vehicles have a wide variety of sensor technology and environmental lighting hardware available, and are continuously adding new capabilities are being continuously adding as technology improves, scale increases, and costs reduce. However, the data produced by the sensors is currently trapped in silos for single-use purpose, resulting an enormous universe of untapped data available in vehicles. A vehicle experience system uses these sensor inputs to create a personalized, first-class customized experience for drivers and/or passengers of vehicles.

One feature that can be controlled by the vehicle experience system is lighting inside the vehicle. The vehicle can include light sources, such as light emitting diodes (LEDs), distributed throughout an interior of the vehicle. The vehicle experience system can control configurations of the light sources to identify/communicate a brand associated with the vehicle, to respond to contextual circumstances around or inside the vehicle, to react responsively to the driver, to communicate safety related messages or warnings to the driver and/or passengers, to match, complement or enhance the entertainment being played or watched within the vehicle interior, or to achieve a desired result based on a combination of these factors.

In some embodiments, a vehicle includes an internal lighting system with a plurality of lighting devices. The internal lighting system is capable of outputting multiple different lighting configurations. The vehicle further include one or more sensors, and a processor communicatively coupled to the internal lighting system and the one or more sensors. The processor is configured to cause the internal lighting system to output a first lighting configuration. Based on data captured by the one or more sensors, the processor is further configured to detect a trigger criterion has been satisfied. In response to detecting the satisfaction of the trigger criterion, the processor is configured to modify a configuration of the internal lighting system to output a second lighting configuration.

In some embodiments, a computing device performs a method to configure a lighting system in an interior of a vehicle. The computing device communicates with the lighting system, which includes a plurality of lighting devices that are collectively capable of outputting multiple different lighting configurations in the interior of the vehicle. While a first lighting configuration is active in the vehicle, the computing device receives an indication that a trigger criterion has been satisfied. In response to the satisfaction of the trigger criterion, the computing device applies a model to select a second lighting configuration that is different from the first lighting configuration. The computing device sends an instruction to the lighting system to cause the lighting system to change from the first lighting configuration to the second lighting configuration.

System Overview

Figure 1:
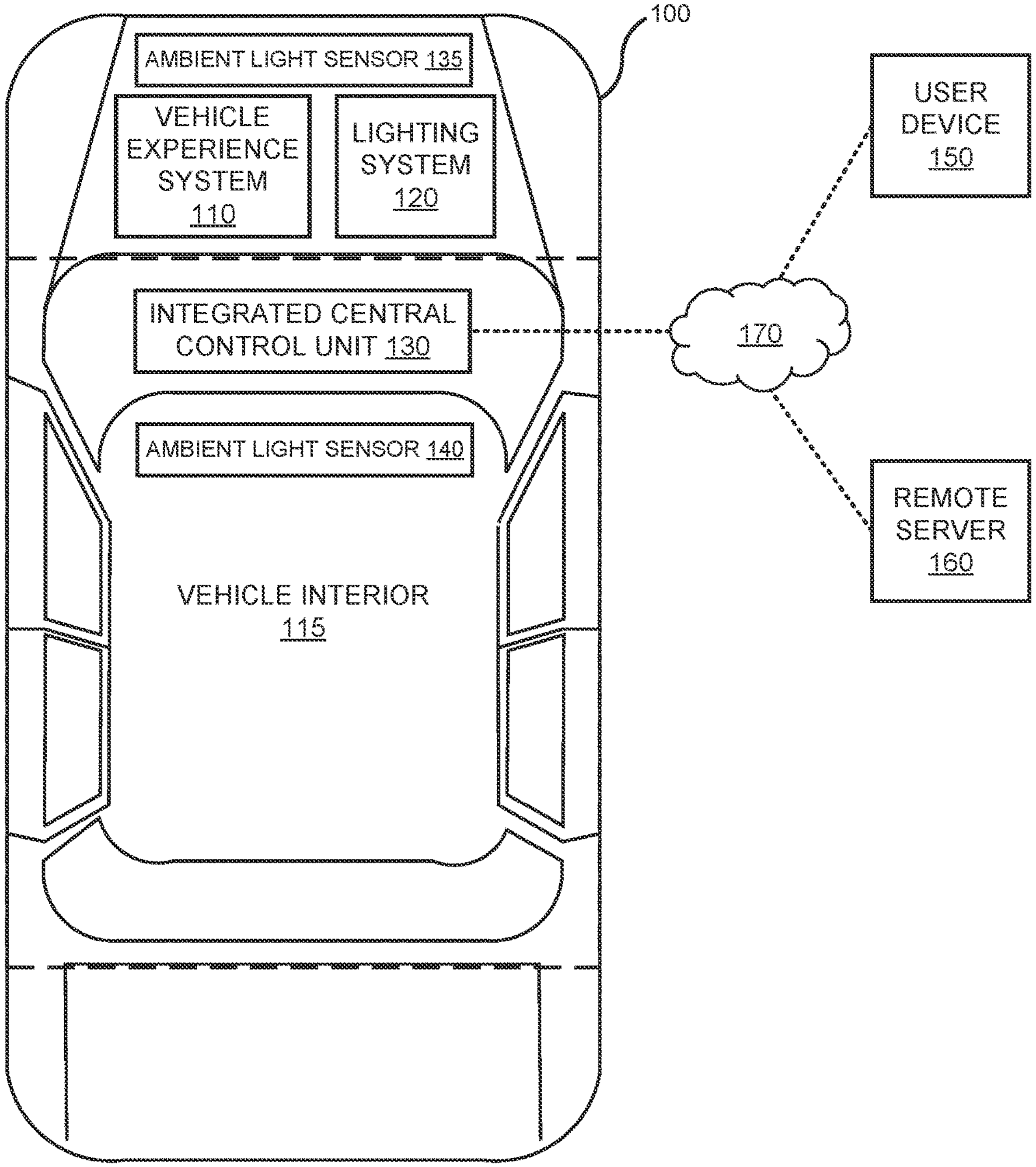
FIG. 1 is a schematic diagram illustrating an example vehicle 100.

FIG. 1 is a schematic diagram illustrating an example vehicle 100. As shown in FIG. 1, the vehicle 100 can include a vehicle experience system 110, a lighting system 120, and an integrated central control unit 130.

The vehicle 100 can include any vehicle capable of carrying one or more passengers, including any type of land-based automotive vehicle (such as cars, trucks, or buses), train or Hyperloop, flying vehicle (such as airplanes, helicopters, vertical takeoff and landing or space shuttles), or aquatic vehicle (such as cruise ships). The vehicle 100 can be a vehicle operated by any driving mode, including fully manual (human-operated) vehicles, self-driving vehicles, or hybrid-mode vehicles that can switch between manual and self-driving modes. As used herein, a "self-driving" mode is a mode in which the vehicle 100 operates at least one driving function in response to real-time feedback of conditions external to the vehicle 100 and measured automatically by the vehicle 100. The driving functions can include any aspects related to control and operation of the vehicle, such as speed control, direction control, or lane positioning of the vehicle 100. To control the driving functions, the vehicle 100 can receive real-time feedback from external sensors associated with the vehicle 100, such as sensors capturing image data of an environment around the vehicle 100, or sources outside the vehicle 100, such as another vehicle or the remote server 160. The vehicle 100 can process the sensor data to, for example, identify positions and/or speeds of other vehicles proximate to the vehicle 100, track lane markers, identify non-vehicular entities on the road such as pedestrians or road obstructions, or interpret street signs or lights. In some cases, the vehicle 100 operates in an autonomous mode under some driving circumstances, such that the driver does not need to control any driving functions during the autonomous operation. In other cases, the vehicle 100 controls one or more driving functions while the driver concurrently controls one or more other driving functions.

The vehicle 100 can have a regular driver, or a person who is usually driving the vehicle when the vehicle is operated. This person may, for example, be an owner of the vehicle 100. In other cases, the vehicle 100 can be a shared vehicle that does not have a regular driver, such as a rental vehicle or ride-share vehicle.

In some embodiments, a vehicle 100 can retrieve a user profile that is associated with a user that primarily operates the vehicle. In other embodiments, upon detecting a user in the vehicle (e.g., by an indication from a mobile device, facial recognition), a unique user profile associated with the user can be retrieved. Based on the user profile, user-specific output actions can be performed that modify various settings in the vehicle, such as lighting settings.

The lighting system 120 includes light-emitting devices in the vehicle interior 115, at least some of which are controllable via the vehicle experience system 110. For example, at least some of the light-emitting devices can be turned on or turned off by control signals generated by the vehicle experience system 110 or caused to emit different colors of light and/or different intensities of light in response to control signals. Some of the light-emitting devices that are controllable as part of the lighting system 120 may have functions additional to the function of emitting light. For example, display screens that are used to display information about the state of the vehicle may be controllable by the vehicle experience system 110 to, for example, modify the brightness of the light emitted by the display screen or to change the colors of light that are output by the display screen.

The light-emitting devices in the lighting system 120 can be distributed throughout the vehicle interior 115. In various implementations, the light-emitting devices can include overhead lights, lights surrounding a substantial portion of the perimeter of the vehicle interior 115 (such as light strips or bulbs distributed along a ceiling, a floor, or in the vehicle's doors or side panels), or display devices positioned near a driver and/or passenger seats in the vehicle. Any of a variety of other types of lighting devices or lighting device positions may be included in the lighting system 120.

The vehicle experience system 110 controls aspects of a passenger's experience inside the vehicle 100. The vehicle experience system 110 can interface between sensors and output devices in the vehicle to control outputs by the output devices based at least in part on signals received from the sensors. The vehicle experience system 110 can also control outputs of the lighting system 120, based on factors such as time, context of the vehicle, or parameters measured by sensors in the vehicle. When controlling outputs of the lighting system 120, the vehicle experience system 110 can select and generate control signals to implement a lighting configuration. The lighting configuration can include a setting for each light-emitting device in the vehicle, defining whether the device is turned on or turned off, a color to be emitted by the device, or a brightness of the light to be emitted. Lighting configurations can further include sequences for lighting, indicating, for example, whether each light-emitting device will emit a steady light signal, short blinks of light, longer blinks of light, light that transitions at a specified rate from one color to another, light with cyclically varying brightness, or any other possible time-dependent changes to the emitted light.

The integrated central control unit 130 includes hardware processors, such as one or more central processing units, graphical processing units, or neural processing units. In some embodiments, the integrated central control unit 130 can be used to implement the vehicle experience system 110. The integrated central control unit 130 can also couple to other components of the vehicle, such as driving or safety systems in the vehicle, entertainment systems, or sensors that measure parameters inside or outside the vehicle.

The vehicle 100 can further include one or more ambient light sensors, such as an external ambient light sensor 135 and/or an internal ambient light sensor 140. Signals generated by the ambient light sensors 135, 140 can in some embodiments be used as feedback to the vehicle experience system 110, enabling the vehicle experience system 110 to receive real-time feedback about lighting conditions and adjust outputs by the lighting system 120 accordingly. In other embodiments, the signals generated by the ambient light sensors 135, 140 can be used to as inputs to configure light outputs by the lighting system 120.

As further shown in FIG. 1, the vehicle 100 can communicate with a user device 150 and/or a remote server 160. The user device 150 is a computing device brought into the vehicle 100 by a passenger or driver in the vehicle, such as a mobile phone, tablet, laptop computer, smart watch, or smart glasses. The remote server 160 is a computing device that is located outside of the vehicle. For example, the remote server 160 can be a cloud-based server that executes applications related to processing data associated with many vehicles 100 or operating the vehicles 100. Either the user device 150 or remote server 160, or both, can communicate with the vehicle 100 (e.g., through the integrated central control unit 130 or via another system in the vehicle) to receive data captured or generated by the vehicle, to transmit settings or configurations to the vehicle for implementation by the vehicle, or to directly implement lighting configurations in the vehicle.

The user device 150 and remote server 160 can optionally communicate with the vehicle 100 over a network 170. The network 170 can include any of a variety of individual connections via the internet such as cellular or other wireless networks, such as 4G networks, 5G networks, or WiFi. In some embodiments, the network may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network may comprise any type of computer networking arrangement used to exchange data. For example, the network may be the Internet, a private data network, virtual private network using a public network, and/or other suitable connection(s) that enables components in a system environment to send and receive information between the components. The network may also include a public switched telephone network ("PSTN") and/or a wireless network.

Figure 2:
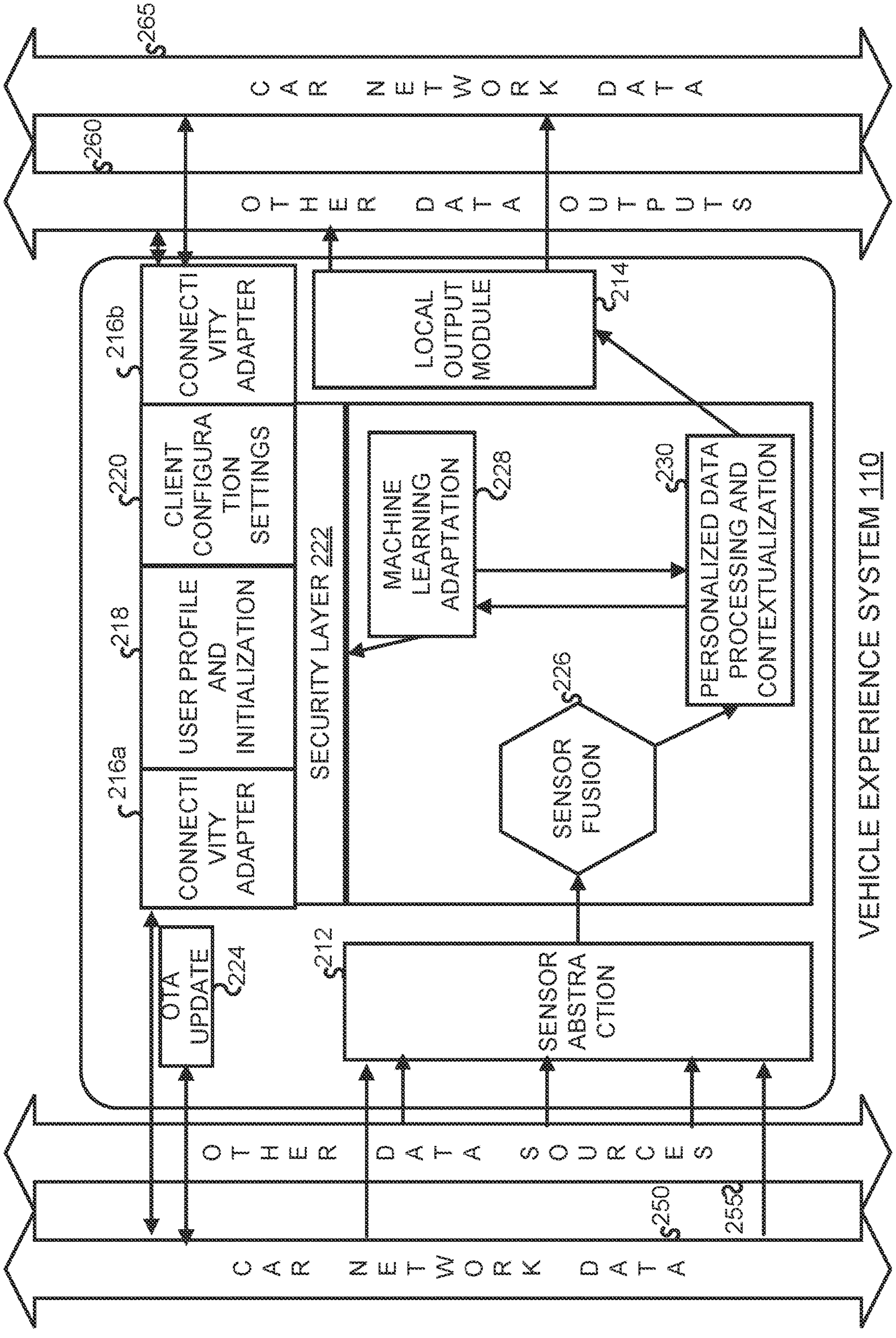
FIG. 2 is a block diagram illustrating components of an automotive experience system.

FIG. 2 is a block diagram illustrating components of the vehicle experience system 110, according to some embodiments.

As shown in FIG. 2, the vehicle 100 can include a vehicle experience system 110. The vehicle experience system 110 controls an experience for passengers in the vehicle 100. The vehicle experience system 110 can include computer software and hardware to execute the software, special-purpose hardware, or other components to implement the functionality of the lighting system 120 described herein. For example, the vehicle experience system 110 can include programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc. In some embodiments, the vehicle experience system is implemented using hardware in the vehicle 100 that also performs other functions of the vehicle. For example, the vehicle experience system can be implemented within an infotainment system in the vehicle 100. In other embodiments, components such as one or more processors or storage devices can be added to the vehicle 100, where some or all functionality of the vehicle experience system 110 is implemented on the added hardware.

The vehicle experience system 110 can read and write to a car network bus 250. The car network bus 250, implemented for example as a controller area network (CAN) bus inside the vehicle 100, enables communication between components of the vehicle, including electrical systems associated with driving the vehicle (such as engine control, anti-lock brake systems, parking assist systems, and cruise control) as well as electrical system associated with comfort or experience in the interior of the vehicle (such as temperature regulation, audio systems, chair position control, or window control). The vehicle experience system 110 can also read data from or write data to other data sources 255 or other data outputs 260, including one or more other on-board buses (such as a local interconnect network (LIN) bus or comfort-CAN bus), a removable or fixed storage device (such as a USB memory stick), or a remote storage device that communicates with the vehicle experience system over a wired or wireless network.

The car network bus 250 or other data sources 255 provide raw data from sensors inside or outside the vehicle, such as the sensors. Example types of data that can be made available to the vehicle experience system 110 over the car network bus 250 include vehicle speed, acceleration, lane position, steering angle, global position, in-cabin decibel level, audio volume level, current information displayed by a multimedia interface in the vehicle, force applied by the user to the multimedia interface, ambient light, or humidity level. Data types that may be available from other data sources 255 include raw video feed (whether from sources internal or external to the vehicle), audio input, user metadata, user state, user biometric parameters, calendar data, user observational data, contextual external data, traffic conditions, weather conditions, in-cabin occupancy information, road conditions, user drive style, or non-contact biofeedback. Any of a variety of other types of data may be available to the vehicle experience system 110.

Some embodiments of the vehicle experience system 110 process and generate all data for controlling systems and parameters of the vehicle 100, such that no processing is done remotely (e.g., by the remote server 160). Other embodiments of the vehicle experience system 110 are configured as a layer interfacing between hardware components of the vehicle 100 and the remote server 160, transmitting raw data from the car network 250 to the remote server 160 for processing and controlling systems of the vehicle 100 based on the processing by the remote server 160. Still other embodiments of the vehicle experience system 110 can perform some processing and analysis of data while sending other data to the remote server 160 for processing. For example, the vehicle experience system 110 can process raw data received over the car network bus 250 to generate intermediate data, which may be anonymized to protect privacy of the vehicle's passengers. The intermediate data can be transmitted to and processed by the remote server 160 to generate a parameter for controlling the vehicle 100. The vehicle experience system 110 can in turn control the vehicle based on the parameter generated by the remote server 160. As another example, the vehicle experience system 110 can process some types of raw or intermediate data, while sending other types of raw or intermediate data to the remote server 160 for analysis.

Some embodiments of the vehicle experience system 110 can include an application programing interface (API) enabling remote computing devices, such as the remote server 160, to send data to or receive data from the vehicle 100. The API can include software configured to interface between a remote computing device and various components of the vehicle 100. For example, the API of the vehicle experience system 110 can receive an instruction from a remote device to apply a lighting configuration to the lighting system 120 and cause the lighting system 120 to output the lighting configuration.

As shown in FIG. 2, some embodiments of the vehicle experience system 110 can include a sensor abstraction component 212, an output module 214, a connectivity adapter 216*a-b*, a user profile module 218, a settings module 220, a security layer 222, an over the air (OTA) update module 224, a processing engine 230, a sensor fusion module 226, and a machine learning adaptation module 228. Other embodiments of the vehicle experience system 110 can include additional, fewer, or different components, or can distribute functionality differently between the components. The components of the vehicle experience system 110 can include any combination of software and hardware, including, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc. In some cases, the vehicle experience system 110 includes one or more processors, such as a central processing unit (CPU), graphical processing unit (GPU), or neural processing unit (NPU), that executes instructions stored in a non-transitory computer readable storage medium, such as a memory.

The sensor abstraction component 212 receives raw sensor data from the car network 250 and/or other data sources 255 and normalizes the inputs for processing by the processing engine 230. The sensor abstraction component 212 may be adaptable to multiple vehicle models and can be readily updated as new sensors are made available.

The output module 214 generates output signals and sends the signals to the car network 265 or other data sources 260 to control electrical components of the vehicle. The output module 214 can receive a state of the vehicle and determine an output to control at least one component of the vehicle to change the state. In some embodiments, the output module 214 includes a rules engine that applies one or more rules to the vehicle state and determines, based on the rules, one or more outputs to change the vehicle state. For example, if the vehicle state is drowsiness of the driver, the rules may cause the output module to generate output signals to reduce the temperature in the vehicle, change the radio to a predefined energetic station, and increase the volume of the radio.

The connectivity adapter 216*a-b* enables communication between the vehicle experience system 110 and external storage devices or processing systems. The connectivity adapter 216*a-b* can enable the vehicle experience system 110 to be updated remotely to provide improved capability and to help improve the vehicle state detection models applied by the processing engine. The connectivity adapter 216*a-b* can also enable the vehicle experience system 110 to output vehicle or user data to a remote storage device or processing system. For example, the vehicle or user data can be output to allow a system to analyze for insights or monetization opportunities from the vehicle population. In some embodiments, the connectivity adapter can interface between the vehicle experience system 110 and wireless network capabilities in the vehicle. Data transmission to or from the connectivity adapter can be restricted by rules, such as limits on specific hours of the day when data can be transmitted or maximum data transfer size. The connectivity adapter may also include multi-modal support for different wireless methods (e.g., 5G or WiFi).

The user profile module 218 manages profile data of a user of the vehicle (such as a driver). Because the automotive experience generated by the vehicle experience system 110 can be highly personalized for each individual user in some implementations, the user profile module generates and maintains a unique profile for the user. The user profile module can encrypt the profile data for storage. The data stored by the user profile module may not be accessible over the air. In some embodiments, the user profile module maintains a profile for any regular driver of a car, and may additionally maintain a profile for a passenger of the car (such as a front seat passenger). In other embodiments, the user profile module 218 accesses a user profile, for example from the remote server 160, when a user enters the vehicle 100.

The settings module 220 improves the flexibility of system customizations that enable the vehicle experience system 110 to be implemented on a variety of vehicle platforms. The settings module can store configuration settings that streamline client integration, reducing an amount of time to implement the system in a new vehicle. The configuration settings also can be used to update the vehicle during its lifecycle, to help improve with new technology, or keep current with any government regulations or standards that change after vehicle production. The configuration settings stored by the settings module can be allowed locally through a dealership update or remotely using a remote campaign management program to update vehicles over the air.

The security layer 222 manages data security for the vehicle experience system 110. In some embodiments, the security layer encrypts data for storage locally on the vehicle and when sent over the air to deter malicious attempts to extract private information. Individual anonymization and obscuration can be implemented to separate personal details as needed. The security and privacy policies employed by the security layer can be configurable to update the vehicle experience system 110 for compliance with changing government or industry regulations.

In some embodiments, the security layer 222 implements a privacy policy. The privacy policy can include rules specifying types of data that can or cannot be transmitted to the remote server 160 for processing. For example, the privacy policy may include a rule specifying that all data is to be processed locally, or a rule specifying that some types of intermediate data scrubbed of personally identifiable information can be transmitted to the remote server 160. The privacy policy can, in some implementations, be configured by an owner of the vehicle 100. For example, the owner can select a high privacy level (where all data is processed locally), a low privacy level with enhanced functionality (where data is processed at the remote server 160), or one or more intermediate privacy levels (where some data is processed locally and some is processed remotely).

Alternatively, the privacy policy can be associated with one or more privacy profiles defined for the vehicle 100, a passenger in the vehicle, or a combination of passengers in the vehicle, where each privacy profile can include different rules. In some implementations, where for example a passenger is associated with a profile that is ported to different vehicles or environment, the passenger's profile can specify the privacy rules that are applied dynamically by the security layer 222 when the passenger is in the vehicle 100 or environment. When the passenger exits the vehicle and a new passenger enters, the security layer 222 retrieves and applies the privacy policy of the new passenger.

The rules in the privacy policy can specify different privacy levels that apply under different conditions. For example, a privacy policy can include a low privacy level that applies when a passenger is alone in a vehicle and a high privacy level that applies when the passenger is not alone in the vehicle. Similarly, a privacy policy can include a high privacy level that applies if the passenger is in the vehicle with a designated other person (such as a child, boss, or client) and a low privacy level that applies if the passenger is in the vehicle with any person other than the designated person. The rules in the privacy policy, including the privacy levels and when they apply, may be configurable by the associated passenger. In some cases, the vehicle experience system 110 can automatically generate the rules based on analysis of the passenger's habits, such as by using pattern tracking to identify that the passenger changes the privacy level when in a vehicle with a designated other person.

The OTA update module 224 enables remote updates to the vehicle experience system 110. In some embodiments, the vehicle experience system 110 can be updated in at least two ways. One method is a configuration file update that adjusts system parameters and rules. The second method is to replace some or all of firmware associated with the system to update the software as a modular component to host vehicle device.

The processing engine 230 processes sensor data and determines a state of the vehicle. The vehicle state can include any information about the vehicle itself, the driver, or a passenger in the vehicle. For example, the state can include an emotion of the driver, an emotion of the passenger, or a safety concern (e.g., due to road or traffic conditions, the driver's attentiveness or emotion, or other factors). As shown in FIG. 2, the processing engine can include a sensor fusion module, a personalized data processing module, and a machine learning adaptation module.

The sensor fusion module 226 receives normalized sensor inputs from the sensor abstraction component 212 and performs pre-processing on the normalized data. This preprocessing can include, for example, performing data alignment or filtering the sensor data. Depending on the type of data, the pre-processing can include more sophisticated processing and analysis of the data. For example, the sensor fusion module 226 may generate a spectrum analysis of voice data received via a microphone in the vehicle (e.g., by performing a Fourier transform), determining frequency components in the voice data and coefficients that indicate respective magnitudes of the detected frequencies. As another example, the sensor fusion module may perform image recognition processes on camera data to, for example, determine the position of the driver's head with respect to the vehicle or to analyze an expression on the driver's face.

The personalized data processing module 230 applies a model to the sensor data to determine the state of the vehicle. The model can include any of a variety of classifiers, neural networks, or other machine learning or statistical models enabling the personalized data processing module to determine the vehicle's state based on the sensor data. Once the vehicle state has been determined, the personalized data processing module can apply one or more models to select vehicle outputs to change the state of the vehicle. For example, the models can map the vehicle state to one or more outputs that, when effected, will cause the vehicle state to change in a desired manner.

The machine learning adaptation module 228 continuously learns about the user of the vehicle as more data is ingested over time. The machine learning adaptation module may receive feedback indicating the user's response to the vehicle experience system 110 outputs and use the feedback to continuously improve the models applied by the personalized data processing module. For example, the machine learning adaptation module 228 may continuously receive determinations of the vehicle state. The machine learning adaptation module can use changes in the determined vehicle state, along with indications of the vehicle experience system 110 outputs, as training data to continuously train the models applied by the personalized data processing module.

Figure 3:
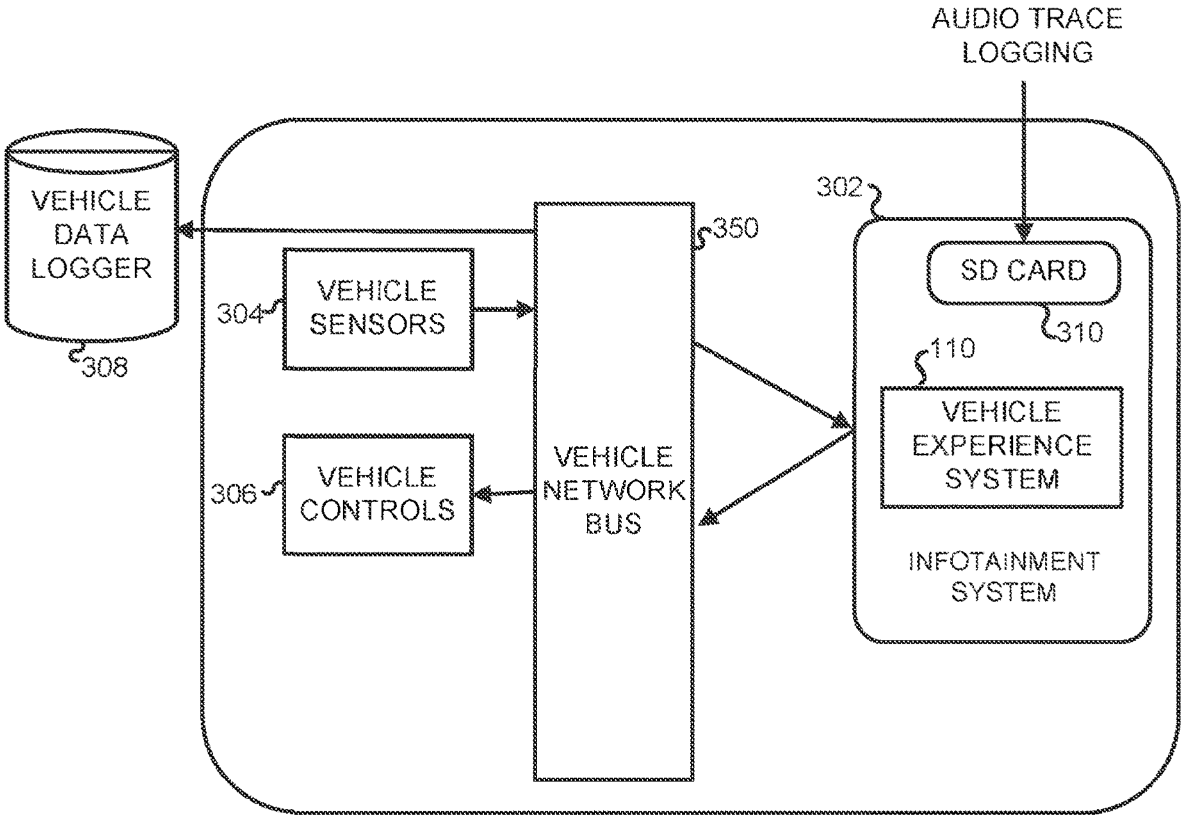
FIG. 3 is a block diagram illustrating an example configuration of an automotive experience system with respect to other components of a vehicle.

FIG. 3 is a block diagram illustrating an example configuration of the vehicle experience system 110 with respect to other components of the vehicle. The infotainment system 302, along with vehicle sensors 304 and vehicle controls 306, can communicate with other electrical components of the vehicle over the car network 350. The vehicle sensors 304 can include any of a variety of sensors configured to generate data related to parameters inside the vehicle and outside the vehicle, including parameters related to one or more passengers inside the vehicle. The vehicle controls 306 can control various components of the vehicle. A vehicle data logger 308 may store data read from the car network bus 350, for example for operation of the vehicle. In some embodiments, the infotainment system 302 can also include a storage device 310, such as an SD card, to store data related to the infotainment system, such as audio logs, phone contacts, or favorite addresses for a navigation system. The infotainment system 302 can include the vehicle experience system 110 that can be utilized to increase user experience in the vehicle.

Although FIG. 3 shows that the vehicle experience system 110 may be integrated into the vehicle infotainment system in some cases, other embodiments of the vehicle experience system 110 may be implemented using standalone hardware. For example, one or more processors, storage devices, or other computer hardware can be added to the vehicle and communicatively coupled to the vehicle network bus, where some or all functionality of the vehicle experience system 110 can be implemented on the added hardware.

Controlling Lighting in a Vehicle Interior

Figure 4:
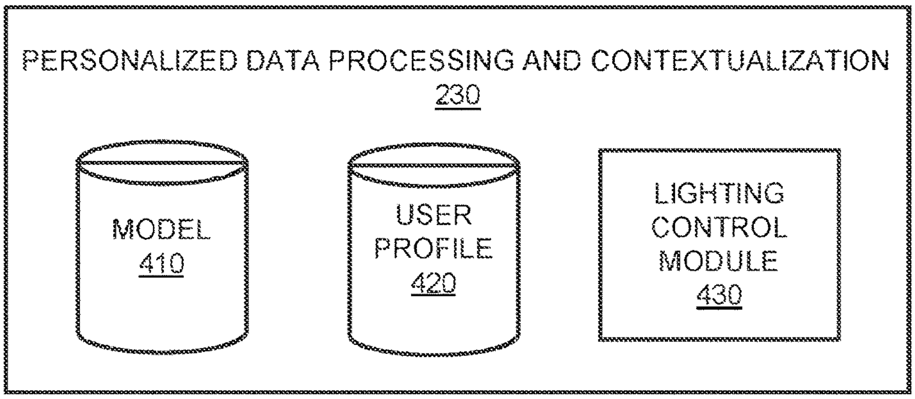
FIG. 4 is a block diagram illustrating modules within a personalized data processing and contextualization module.

FIG. 4 is a block diagram illustrating modules within the personalized data processing and contextualization module 230, according to some embodiments. As shown in FIG. 4, the module 230 can include a lighting control module 430 and can maintain or access a model 410 and a user profile 420. Other embodiments of the personalized data processing and contextualization module 230 can include additional modules and/or data stores. Furthermore, some or all functionality described as being performed by the personalized data processing and contextualization module 230 can be performed by other modules or subsystems of the vehicle experience system 110 in other embodiments.

The model 410 includes rules, trained machine learning models, or a combination thereof, that can be applied by the lighting control module 430 to control the lighting in the vehicle interior.

In some embodiments, the model 410 includes a set of predefined rules to cause specified lighting outputs in response to a specified trigger criterion or for each of multiple trigger criteria. The rules in the model 410 can be defined by any entity, such as a manufacturer of the vehicle, a service provider associated with the vehicle, a user of the vehicle, or a third-party provider of content or services accessed in association with the vehicle.

In some embodiments, the model 410 includes a machine learning model trained to generate desired lighting outputs. The machine learning model can be trained for a general user, a type of user, or a specific user of the vehicle, using, respectively, data associated with many users of any type, associated with users of a specified type, or only associated with the specific user of the vehicle. Training the machine learning model can include training the model to detect trigger criteria (e.g., to detect when to change a lighting configuration in the vehicle), the lighting configuration that should be implemented in response to each trigger criterion, or both. For example, some implementations of the machine learning model are trained to detect when the user is dissatisfied with the current lighting configuration (e.g., because the user is squinting to read content inside or outside the vehicle or is moving to either be closer to or shielded from the light). Other implementations or other machine learning models are trained, for example, to determine a desired lighting configuration under specified circumstances, such as specified times of day, specified starting or ending locations, or specified road or weather conditions.

The user profile 420 stores information associated with a passenger in the vehicle. The user profile 420 can include information explicitly input by the associated passenger or implicitly determined based on habits or behaviors of the passenger. For example, the user profile 420 can identify home and work addresses of the passenger, hours the passenger typically works, or preferences of the passenger.

In some embodiments, the personalized data processing and contextualization module 230 stores the user profile 420 for a regular passenger in the vehicle, such as the driver who exclusively or primarily drives the vehicle. In other embodiments, the personalized data processing and contextualization module 230 accesses the user profile 420 associated with a user who logs into the vehicle or that the vehicle identifies as entering the vehicle. For example, if the vehicle 100 is a rideshare vehicle ordered by a passenger via a rideshare application, the personalized data processing and contextualization module 230 can receive an identifier of the passenger from the rideshare application and retrieve a user profile associated with the passenger using the identifier.

The lighting control module 430 generates instructions to control lighting in the vehicle interior 115. The lighting control module 430 can be communicatively coupled to the lighting system 120 to output the generated instructions to the lighting system 120, which implements lighting configurations based on the instructions. The lighting control module 430 can also be communicatively coupled to one or more input sources, such as the vehicle network, the external or internal ambient light sensors 135, 140, or external data sources, to receive input data. By processing the input data, at least some implementations of the lighting control module 430 detect triggering criteria. The triggering criteria can be analyzed using the model 410 to select the lighting system 120 configuration and generate instructions to implement the selected configuration.

Some implementations of the lighting control module 430 are executed by devices external to the vehicle 100, such as the user device 150 or the remote server 160. In this case, the lighting control module 430 establishes a communication channel with a system internal to the vehicle, such as the lighting system 120, to receive data indicative of trigger criteria and transmit lighting control instructions to the lighting system 120.

The lighting control signals can be generated based at least in part on the input data. In some implementations, the lighting control module 430 generates the output control signals based on application of the model 410. Some of the lighting configurations generated based on application of the model 410 are based on a determination that certain light configurations will have certain effects on a driver or passengers in the vehicle 100. Other lighting configurations can be set to achieve a specified goal other than an effect on the driver, such as identifying the vehicle or the driver.

One example type of trigger criteria detected by the lighting control module 430 is an action related to a beginning or an end of an operating session in the vehicle 100, such as a user entering a vehicle, turning on a vehicle, starting navigation, reaching a destination, or turning off a vehicle. In one example, the model 410 includes one or more rules that when applied cause the lighting control module 430 to generate a signature light pattern or color that identifies the user or a brand associated with the vehicle. For example, a car manufacturer may provide a rule to output a specific lighting pattern as a brand signifier each time a driver starts the car. Similarly, brand signifiers can be provided by brands associated with software platforms in the vehicle (such as the infotainment system), brands who own or operate the vehicle (such as the rideshare company operating a car or the airline operating an airplane), or other brands affiliated with the vehicle. As another example, a brand associated with an infotainment software platform in the vehicle can provide a rule to output a particular light sequence to provide feedback to a passenger, such as to confirm instructions from the passenger. In yet another example, a light sequence is associated with a particular passenger, and a rule causes the lighting control module 430 to output the passenger's light sequence in response to a trigger condition specified in the rule. For example, the passenger's light sequence can be output when the passenger enters a rideshare vehicle, helping the passenger to confirm that she is in the correct vehicle.

Another example type of trigger criterion is a time-based criterion. For example, different lighting configurations can be output at different times of day, days of the week, or months of the year. In some cases, the time-based trigger criteria can also take user profile data as inputs to determine the lighting outputs. For example, for a passenger who drives to work in the morning and drives home in the evening, the lighting control module 430 can output an energizing light configuration in the morning and a calming light configuration in the evening. For a passenger who instead drives to work in the evening and drives home in the morning, the lighting control module 430 can output an energizing light configuration in the evening and a calming light configuration in the morning. Alternatively, different lighting configurations can be output relative to events on a user's calendar. For example, the lighting system 430 can output a short notification lighting sequence when the user has a meeting or event on his or her calendar within a specified amount of time (e.g., 5 minutes or 30 minutes).

Some trigger criteria and associated lighting configurations can be defined by a third-party content provider. When serving content to the vehicle 100 for output in the vehicle, content providers can indicate lighting cues or configurations for output in conjunction with the content output. For example, an audio media content item (such as a song) can have associated lighting cues that causes the lights to change suddenly (e.g., when a beat drops) or slowly throughout the output of the content item. Video content items, such as movies, can also include lighting cues and configurations that change the lighting throughout the movie to make the movie watching experience more immersive. For example, a producer or other entity associated with a movie can specify that different colors or brightness of lights should be output at different times during the movie to match or complement the lighting in the movie.

A further example type of trigger criteria includes a context of the vehicle. The context can include any parameters of an environment outside the vehicle, such as location of the vehicle, weather at the vehicle's location, type or condition of road the vehicle is traveling on, amount of traffic, or an amount of ambient light outside or inside the vehicle. The context can further include information about an operating mode of the vehicle or status of the user, such as whether the vehicle is operated in self-driving mode or manual mode, or whether the user is performing a specified activity inside the vehicle. For example, different lighting configurations can be output when the weather is warm and sunny than when it is rainy, or when the vehicle is driving on a highway versus a dirt road. Lighting configurations can mimic traffic signals outside the vehicle, such as outputting red light when the vehicle is approaching or waiting at a red traffic light and outputting green light when the traffic light changes to green. A first lighting configuration can be output while the vehicle is operated in self-driving mode, and a second lighting configuration can be output while the vehicle is operated in a manual driving mode. If the user is reading or working inside the vehicle while the vehicle is operated in self-driving mode or while the vehicle is stationary, the lighting system 430 may output brighter light. If instead the user is watching a movie, the lighting system 430 may turn off nearly all lights, leaving, for example, only a small light strip illuminated or to only illuminate lights associated with media controls, a beverage or snack station, or another object or portion of the vehicle the user may need to access during the movie. Similarly, if the user is manually driving the vehicle, the lighting system 430 may turn off nearly all lights to, for example, illuminate only the lights on any display devices that show information relevant to driving the vehicle (such as speed, navigational content, etc.).

Yet another type of trigger criteria is a determination that a user will need to perform an action with respect to operating the vehicle, and the resulting lighting configuration alerts the user to the upcoming action. In some cases, a lighting alert can be generated if a user will need to perform an action after having not performed an action for a period of time before. For example, if the vehicle is operating in self-driving mode, a lighting alert can be output shortly before the vehicle transitions into manual driving mode to notify the user to reengage with driving. As another example, when a vehicle is waiting at a stoplight, a lighting alert can be generated when the light turns green to notify the user to begin driving again. In other cases, a lighting alert can be generated if the user will need to modify an action or change from performing one action to performing another. For example, if the speed limit for the road on which the user is currently driving will drop soon, a lighting alert can be generated to notify the user to reduce the vehicle's speed. Similarly, if the vehicle is approaching an icy patch of road, a lighting alert can be generated to notify the user of the presence of the icy patch and to reduce the vehicle's speed.

Still another category of trigger criteria that can be specified in the model 410 is a detection of a specified biometric parameter of a user in the vehicle 100. For example, different lighting configurations can be output if a user's heartrate is above a specified threshold, if a user's body temperature is above a specified threshold, or if the user's level of stress is above a specified threshold (as measured, for example, via galvanic skin response). For example, if the driver's heart rate is above a specified threshold the lighting control module 430 outputs a first lighting configuration, while a second, different lighting configuration is output if the driver's heart rate is below the threshold. In other cases, the lighting control module 430 can apply a rule that takes multiple biometric parameters as inputs. For example, the lighting control module 430 may apply a rule that determines the driver is distracted based on two or more biometric parameters (such as gaze direction, skeletal tracking, and/or pressure on the steering wheel). If the driver is determined to be distracted, the lighting control module 430 outputs a specified lighting configuration selected to help the driver refocus attention on the road.

A final example type of trigger criteria includes measured emotional states of the driver, where the emotional states can be determined based on a combination of one or more biometric parameters of the driver and/or context of the vehicle. Example methods to determine emotional state of the driver are described with respect to FIGS. 6-7. Application of the model 410 can cause the lighting control module 430 to output a specified lighting configuration if the driver's emotional state is a specified emotional state, based on a determination that the specified lighting configuration will change, mitigate, or enhance the emotional state. For example, if the driver is determined to be stressed, the lighting control module 430 may apply a rule that implements a lighting configuration determined to calm the driver, Other lighting configurations can be selected to energize a fatigued driver, or to help a distracted driver to refocus. Alternatively, application of the model 410 can cause the lighting control module 430 to change a lighting configuration in the vehicle if the driver's emotional state changes from one state to another, as indicated by a change in a measured physiological state of the user. For example, if the lighting control module 430 detects a change in the level of attentiveness of a driver, the lighting control module 430 can output an alert to notify the user to refocus attention to driving. As another example, if the lighting control module 430 detects that the user is exhibiting more signs of stress or agitation than the user's normal baseline level, the lighting control module 430 can modify the lighting configuration to a more relaxing light output.

The model 410 may additionally or alternatively include rules that take multiple factors described above as inputs. For example, a rule may take the time of day, the context of the vehicle, and a biometric parameter of the driver as inputs, and cause the lighting control module 430 to output a specified lighting configuration if all of these factors satisfy specified criteria. For example, a driver stuck in traffic during the day may benefit from a calming lighting configuration to reduce the driver's stress level, while a driver stuck in traffic at night may benefit from an energizing lighting configuration to keep the driver awake and attentive. The model 410 may, as a result, include a first rule that causes implementation of a calming lighting configuration if it is day and traffic is heavy, and a second rule that causes implementation of an energizing lighting configuration if it is night and traffic is heavy.

As discussed above, the model 410 can include a trained machine learning model that can be applied to a variety of inputs, such as time, vehicle context, and/or biometric sensing of the driver, to cause the lighting control module 430 to select lighting configurations. The model can be trained using data from multiple users or can be personalized to the driver. For example, the model 410 can be trained using the driver's responses to previous lighting configurations, whether explicitly provided or derived from biometric data associated with the driver, to enable the model to more accurately predict, for example, whether the driver's level of stress will be lessened by a particular lighting configuration. By applying this personalized model, the lighting control module 430 can implement lighting configurations that are likely to cause particular changes to the emotional state of the driver, to assist the driver to drive more safely, to improve the driver's enjoyment of the vehicle, or to provide other beneficial effects.

The model 410 can include any number of trigger criteria associated with a vehicle or user that cause different lighting outputs at different times. Thus, during any given operating session of a vehicle, the lighting system 430 may modify the lighting configuration any number of times as different trigger criteria are detected.

Figure 5:
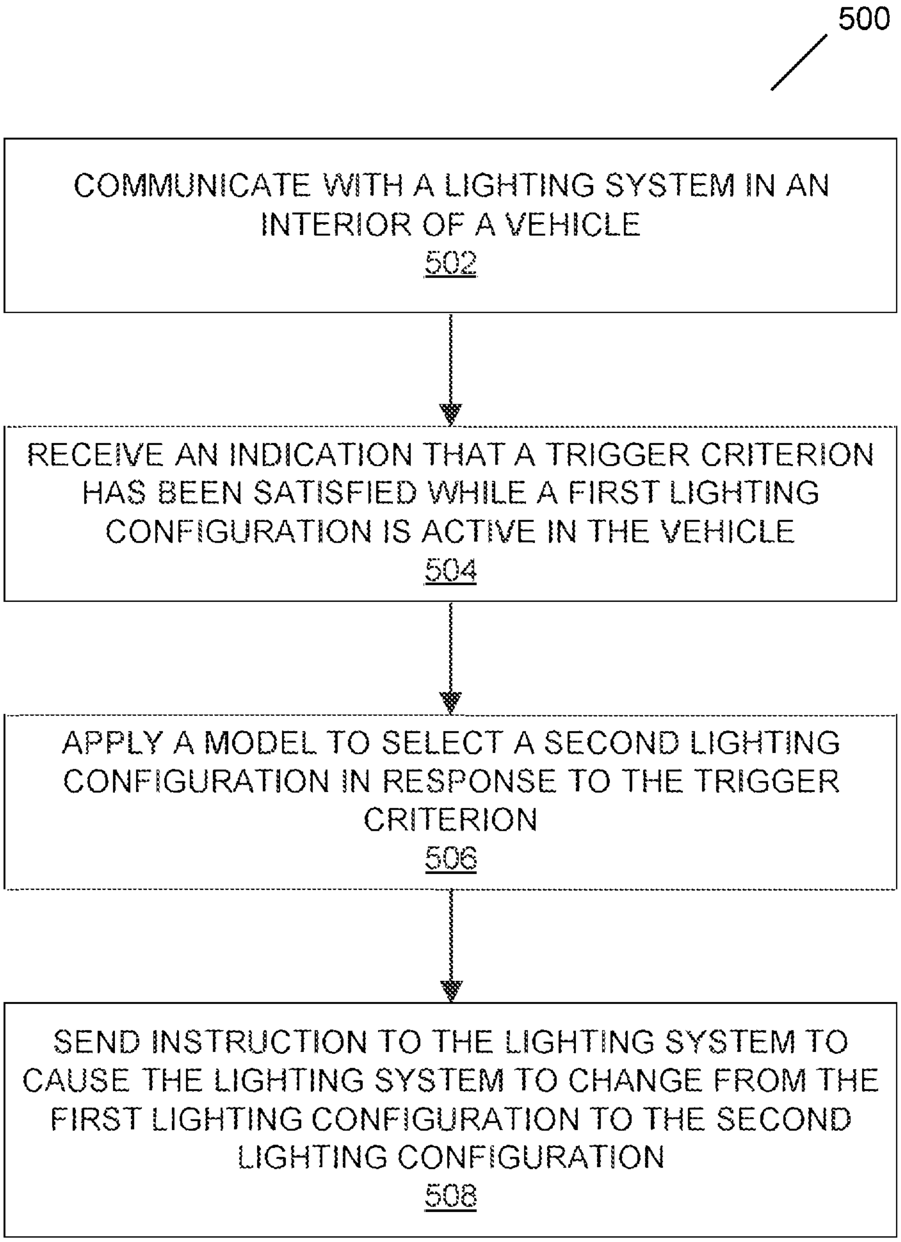
FIG. 5 is a flowchart illustrating a process for configuring a lighting system in a vehicle.

FIG. 5 is a flowchart illustrating a process 500 for automatically controlling lighting configurations in a vehicle, according to some embodiments. The process 500 can be performed in some embodiments by a computing device remote from a vehicle, such as the user device 150 or the remote server 160. Some aspects of the process 500 can instead be performed by a device associated with the vehicle, or functionality can be distributed between various devices internal to or external from the vehicle.

As shown in FIG. 5, the computing device communicates, at block 502, with a lighting system in an interior of a vehicle. The computing device can communicate directly with the lighting system or another system within the vehicle, either over wireless or wired communication. Alternatively, the computing device can communicate with the lighting system via an intermediary system, such as a server.

At block 504, while a first lighting configuration is active in the vehicle, the computing device receives an indication that a trigger criterion has been satisfied. Trigger criteria can relate to any detectable event or state associated with a vehicle. Example trigger criteria include an action related to a beginning or end of an operating session in the vehicle, a time-based criterion, a lighting cue associated with media content output in the vehicle, a context of the vehicle, a determination that a user will need to perform an action associated with the vehicle, a measured biometric parameter of the user, a detected change in a physiological state of the user, or an emotional state of the user.

In response to the indication that the trigger criterion has been satisfied, the computing device applies a model to select a second lighting configuration in response to the trigger criterion. In various implementations, the trigger criterion, the second lighting configuration, or both can be automatically derived, input by a user, specified by an entity associated with a vehicle, or specified by a third party.

At block 508, the computing device sends an instruction to the lighting system in the vehicle to cause the lighting system to change from the first lighting configuration to the second lighting configuration.

After implementing the second lighting configuration in the vehicle, the lighting system of the vehicle may restore the first lighting configuration. For example, if the second lighting configuration comprises a short lighting sequence (such as a lighting alert), the first lighting configuration can be reactivated once the short lighting sequence has been completed. A lighting sequence can be treated as "short" if it has a defined end, or if it is completed, for example, in less than ten seconds, less than one minute, or less than another defined threshold. If the second lighting configuration does not have a defined end, the lighting system of the vehicle can maintain the second lighting configuration until a subsequent trigger criterion has been satisfied and a third lighting configuration is output in response to the subsequent trigger criterion.

Emotional State Detection

Figure 6A:
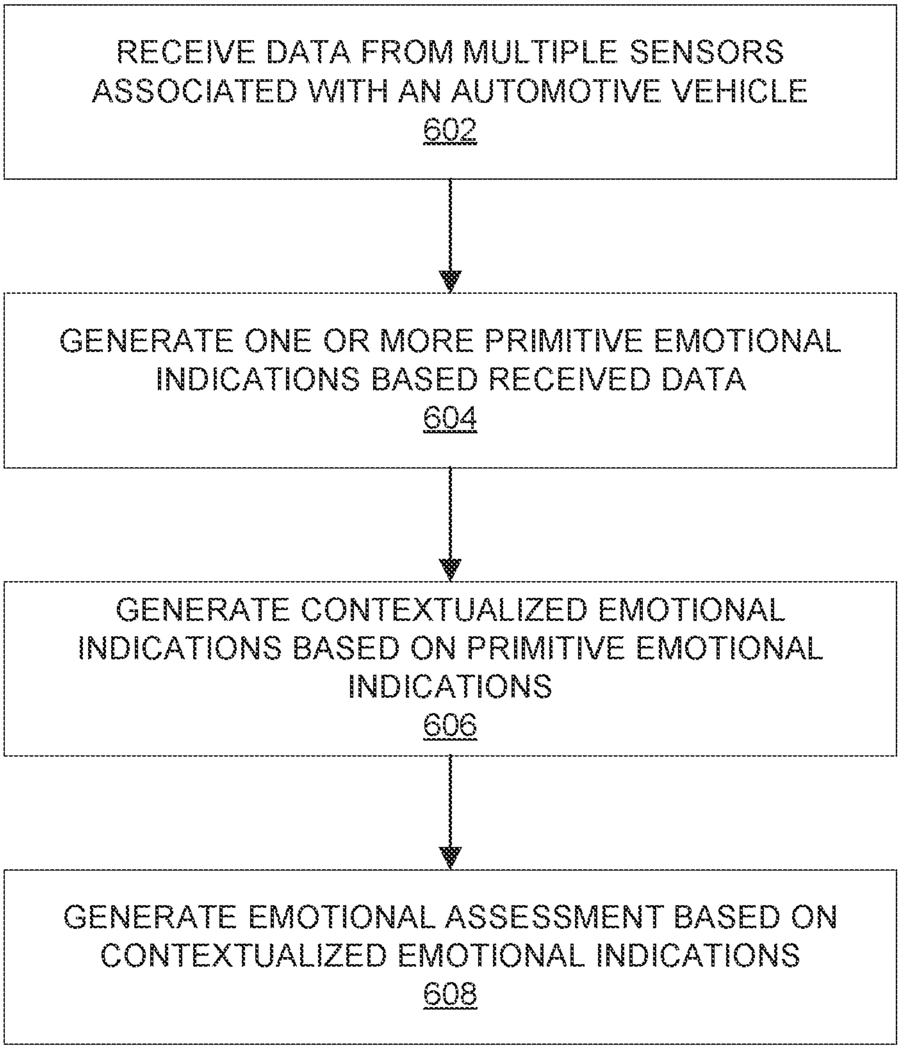
FIGS. 6A-6B illustrate an example process to determine a driver's emotional state.
Figure 6B:
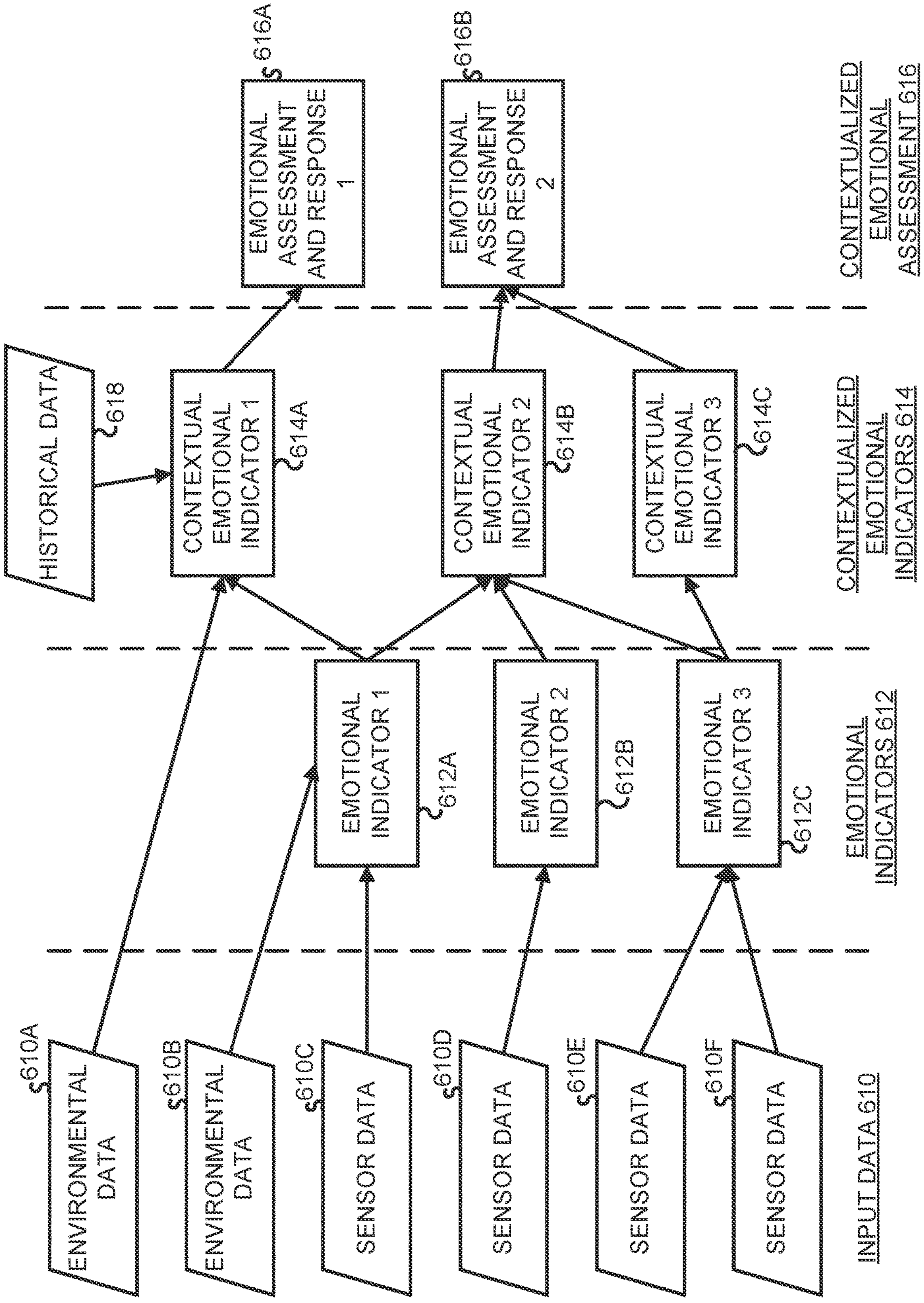

As described above, the automotive experience system can detect emotional states of a person inside the vehicle 100, and this emotional state can be used in some cases to control the vehicle lighting. FIG. 6A is a flowchart illustrating a process to determine the driver's emotional state, and FIG. 6B illustrates example data types detected and generated during the process shown in FIG. 6A. The process for determining a driver's emotional state can be performed by the vehicle experience system 110.

As shown in FIG. 6A, the vehicle experience system 110 can receive, at step 602, data from multiple sensors associated with an automotive vehicle. In addition to the sensor data, the vehicle experience system 110 may receive environmental data indicating, for example, weather or traffic conditions measured by systems other than the vehicle experience system 110 or the sensors associated with the vehicle. FIG. GB shows, by way of example, four types of sensor data and two types of environmental data that can be received at step 602. However, additional or fewer data streams can be received by the vehicle experience system 110.

As shown in FIG. 6B, the types of environmental data can include input data 610, emotional indicators 612, contextualized emotional indicators 614, and contextual emotional assessment 616. The input data 610 can include environmental data 610*a-b* and sensor data 610*c-f*. The emotional indicators 612 can include indicators 612*a-c*. The contextual emotional indicators 614 can include indicators 614*a-c*. In some cases, the contextual emotional indicators 614*a-c* can be modified based on historical data 618. The contextualized emotional assessments 616 can include various emotional assessments and responses 616*a-b*.

The vehicle experience system 110 generates, at step 604, one or more primitive emotional indications based on the received sensor (and optionally environmental) data. The primitive emotional indications may be generated by applying a set of rules to the received data. When applied, each rule can cause the vehicle experience system 110 to determine that a primitive emotional indication exists if a criterion associated with the rule is satisfied by the sensor data. Each rule may be satisfied by data from a single sensor or by data from multiple sensors.

As an example of generating a primitive emotional indication based on data from a single sensor, a primitive emotional indication determined at step 604 may be a classification of a timbre of the driver's voice into soprano, mezzo, alto, tenor, or bass. To determine the timbre, the vehicle experience system 110 can analyze the frequency content of voice data received from a microphone in the vehicle. For example, the vehicle experience system 110 can generate a spectrum analysis identify various frequency components in the voice data. A rule can classify the voice as soprano if the frequency data satisfies a first condition or set of conditions, such as having certain specified frequencies represented in the voice data or having at least threshold magnitudes at specified frequencies. The rule can classify the voice as mezzo, alto, tenor, or bass if the voice data instead satisfies a set of conditions respectively associated with each category.

As an example of generating a primitive emotional indication based on data from multiple sensors, a primitive emotional indication determined at step 604 may be a body position of the driver. The body position can be determined based on data received from a camera and one or more weight sensors in the driver's seat. For example, the driver can be determined to be sitting up straight if the camera data indicates that the driver's head is at a certain vertical position and the weight sensor data indicates that the driver's weight is approximately centered and evenly distributed on the seat. The driver can instead be determined to be slouching based on the same weight sensor data, but with camera data indicating that the driver's head is at a lower vertical position.

The vehicle experience system 110 may determine the primitive emotional indications in manners other than by the application of the set of rules. For example, the vehicle experience system 110 may apply the sensor and/or environmental data to one or more trained models, such as a classifier that outputs the indications based on the data from one or more sensors or external data sources. Each model may take all sensor data and environmental data as inputs to determine the primitive emotional indications or may take a subset of the data streams. For example, the vehicle experience system 1'10 may apply a different model for determining each of several types of primitive emotional indications, where each model may receive data from one or more sensors or external sources.

Example primitive emotional indicators that may be generated by the media selection module 220, as well as the sensor data used by the module to generate the indicators, are as follows:

| Primitive Emotional Indicator | Description | Sensor Needed |
|---|---|---|
| Voice | | |
| Timbre | Unique Overtones and frequency of the voice. Categorized as: Soprano Mezzo Alto Tenor Bass | Microphone |
| DecibelLevel | Absolute decibel level of the human voice detected. | Microphone |
| Pace | The cadence at which the subject isspeaking | Microphone |
| Facial | | |
| Anger | The detection that the occupant is angry and unhappy with something | Front Facing Camera |
| Disgust | The response from a subject of distaste or displeasure | Front Facing Camera |
| Happiness | Happy and general reaction of pleasure | Front Facing Camera |
| Sadness | Unhappy or sad response | Front Facing Camera |
| Surprise | Unexpected situation | Front Facing Camera |
| Neutral | No specific emotional response. | Front Facing Camera |
| Body | | |
| Force of Touch | The level of pressure applied to the Entertainment screen with a user interaction | Entertainment/ Infotainment screen |
| Body Position | The position of the subject body, detected by computer vision in combination with the seat sensors and captured in X, Y, Z coordinates | Camera + Occupant Weight Sensor |

Based on the primitive emotional indications (and optionally also based on the sensor data, the environmental data, or historical data associated with the user), the vehicle experience system 110 generates, at step 606, contextualized emotional indications. Each contextualized emotional indication can be generated based on multiple types of data, such as one or more primitive emotional indications, one or more types of raw sensor or environmental data, or one or more pieces of historical data. By basing the contextualized emotional indications on multiple types of data, the vehicle experience system 110 can more accurately identify the driver's emotional state and, in some cases, the reason for the emotional state.

In some embodiments, the contextualized emotional indications can be determined by applying a set of rules to the primitive indications. For example, the vehicle experience system 110 may determine that contextual emotional indication 2 shown in FIG. 6B exists if the system detected primitive emotional indications 1, 2, and 3. Below is an example emotional indication model including rules that can be applied by the vehicle experience system 110:

Happy:

- Event Detected: Mouth changes shape, corners turn upwards, timbre of voice moves up half an octave
- Classification: Smile
- Contextualization: Weather is good, traffic eases up
- Verification: Positive valence
- Output/Action: Driver is happy, system proposes choices to driver based on ambience, music, driving style, climate control, follow-up activities, linked activities, driving route, suggestions, alternative appointment planning, continuous self-learning, seat position, creating individualized routines for relaxation or destressing.

In other cases, the contextualized emotional indications can be determined by applying a trained model, such as a neural network or classifier, to multiple types of data. For example, primitive emotional indication 1 shown in FIG. 6A may be a determination that the driver is happy. The vehicle experience system 110 can generate contextualized emotional indication 1—a determination that the driver is happy because the weather is good and traffic is light—by applying primitive emotional indication 1 and environmental data (such as weather and traffic data) to a classifier. The classifier can be trained based on historical data, indicating for example that the driver tends to be happy when the weather is good and traffic is light, versus being angry, frustrated, or sad when it is raining or traffic is heavy. In some cases, the model is trained using explicit feedback provided by the passenger. For example, if the vehicle experience system 110 determines based on sensor data that a person is stressed, the vehicle experience system 110 may ask the person "You appear to be stressed; is that true?" The person's answer to the question can be used as an affirmative label to retrain and improve the model for better determination of the contextualized emotional indications.

The contextualized emotional indications can include a determination of a reason causing the driver to exhibit the primitive emotional indications. For example, different contextualized emotional indications can be generated at a different times based on the same primitive emotional indication with different environmental and/or historical data. For example, as discussed above, the vehicle experience system 110 may identify a primitive emotional indication of happiness and a first contextualized emotional indication indicating that the driver is happy because the weather is good and traffic is light. At a different time, the vehicle experience system 110 may identify a second contextualized emotional indication based on the same primitive emotional indication (happiness), which indicates that the driver is happy in spite of bad weather or heavy traffic as a result of the music that is playing in the vehicle. In this case, the second contextualized emotional indication may be a determination that the driver is happy because she enjoys the music.

Finally, at step 608, the vehicle experience system 110 can use the contextualized emotional indications to generate or recommend one or more emotional assessment and response plans. The emotional assessment and response plans may be designed to enhance the driver's current emotional state (as indicated by one or more contextualized emotional indications), mitigate the emotional state, or change the emotional state. For example, if the contextualized emotional indication indicates that the driver is happy because she enjoys the music that is playing in the vehicle, the vehicle experience system 110 can select additional songs similar to the song that the driver enjoyed to ensure that the driver remains happy. As another example, if the driver is currently frustrated due to heavy traffic but the vehicle experience system 110 has determined (based on historical data) that the driver will become happier if certain music is played, the vehicle experience system 110 can play this music to change the driver's emotional state from frustration to happiness. Below are example scenarios and corresponding corrective responses that can be generated by the vehicle experience system 110:

| Contextualized Emotional Scenario | Description | Primitive Emotional Indicators and Sensors | Personalized Corrective Response |
|---|---|---|---|
| Safety | | | |
| Road Rage | The personalized assessment that a driver is aggravated to the point that their actions could harm themselves or others. This assessment will take into consideration the history of the specific user and have a personalized threshold it will learn over time | Vehicle Power Train - Speed, Acceleration External - Traffic, weather Emotional Indicators of Anger and Disgust Body Position Deltas - Physical Agitation | Audio and visual warning for driverto be aware of situation. Massage activated on seat. Temperature reduced in vehicle Mood lighting adjusted to be less upsetting (no red) |
| Entertainment | | | |
| Head Bop | The physical reaction a subject has while listening to a media source. This goes beyond simple enjoyment, to the mode of physical reaction theuser demonstrates. This can be parameterized as Metal, Sway, Pop. | Front Facing Camera (Facial changes, mouthing words) Body Position (Delta) Cabin Microphone (musicbpm, key signature) Entertainment Media Metadata (song, artist, timestamp, volume change) | None - Captured Data Point to be used for analysis or joined with other data for behavioral analysis and/or monetization purposes |
| Comfort | | | |
| Emotional Stability | This feature will assess the desired emotional state of the occupant, and adjust the environment to maintain that state for the subject. The requested state will be requested by the user, and can be Calm, Sad, Intense or Happy. | Front Facing Camera Body Position (Delta) Cabin Microphone Infotainment Status | Change of Audio Station Massage activated on seat. Cabin temperature adjusted in vehicle Mood lighting adjustments Seat temperature |

The following table illustrates other example state changes that can be achieved by the vehicle experience system 110, including the data inputs used to determine a current state, an interpretation of the data, and outputs that can be generated to change the state.

| Emotional Scenario | Data Input | System Interpretation | Output |
|---|---|---|---|
| Stress Reduction | Driver Monitoring Camera<br>Analog Microphone Signal<br>DSP: Music beat detection<br>DSP: Processed audio<br>CAN Data: Speed<br>CAN Data: Acceleration<br>CAN Data: In-cabin decibel level<br>External data: Traffic conditions<br>External data: Weather condition | Facial Coding analysis<br>Voice frequency detection<br>Breathing patterns<br>Deviation from historical user behavior<br>Intensity of acceleration<br>Anomaly detection from norm<br>Pupils dilated<br>Posture recognition<br>Gesture detection<br>Restlessness detection | Alternative Route Suggestions<br>Interactive spoken prompts to driver<br>Enhanced proactive communication regarding uncontrollable stress factors: weather, traffic conditions, location of fueling and rest areas, etc.<br>Activation of adaptive cruise control (ACC)<br>Activation of Lane Assist<br>Modify the light experience<br>Air purification activated<br>Regulate the sound level<br>Aromatherapy activation<br>Dynamic audio volume modification<br>Dynamic drive mode adjustment<br>Activate seat massage<br>Adjust seat position |
| Music Enjoyment | Driver Monitoring Camera<br>Analog Microphone Signal<br>DSP: Music beat detection<br>DSP: In-Cabin Decibel Level<br>CAN Data: Humidity Detection<br>CAN Data: Acceleration<br>CAN Data: Increase in volume level<br>CAN Data: Audio screen in MMI<br>External data: Traffic conditions<br>External data: Weather conditions | Posture recognition<br>Gesture detection<br>Voice frequency detection<br>Facial expression change<br>Zonal determination of music enjoyment<br>Facial Expression determination<br>Voice frequency detection<br>Upper body pose estimation<br>Correlation to past user behavior<br>Detect audio key signature<br>Intensity of acceleration | Lighting becomes dynamically reactive to music<br>All driver assist functions activated (e.g. ACC, Lane Assist)<br>Dynamically-generated music recommendations designed for the specific length of the journey<br>Deactivate seat massage<br>Lower temperature based on increased movement and humidity<br>Dynamic drive mode adjustment to comfort mode<br>When car stopped, Karaoke Mode activated |
| Road Rage Abatement | External data: Traffic conditions<br>Driver Monitoring Camera<br>Analog Microphone Signal<br>DSP: Processed Audio Signal<br>CAN Data: Audio volume level<br>CAN Data: Distance to car ahead<br>CAN Data: Lane position<br>CAN Data: Speed<br>CAN Data: Acceleration<br>CAN Data: In-cabin decibel level<br>External data: Weather conditions<br>DSP: External noise pollution<br>CAN Data: Force touch detection<br>CAN Data: Steering wheel angle | Upper body pose<br>Facial Expression determination<br>Voice frequency detection<br>Breathing patterns<br>Deviation from historical user behavior<br>Intensity of acceleration<br>Check for erratic driving<br>Anomaly detection from norm<br>Pupils dilated<br>Posture recognition<br>Gesture detection<br>Restlessness detection<br>Steering style<br>Restlessness | Alternative Route Suggestions<br>Interactive spoken prompts to driver<br>Explain through simple language the contributing stress factors: Enhanced proactive communication regarding uncontrollable stress factors: weather, traffic conditions, location of fueling and rest areas, etc.<br>Activation of ACC<br>Activation of Lane Assist<br>Modify the light experience<br>Regulate the sound level<br>Air purification activated<br>Aromatherapy activation<br>Dynamic audio volume modification<br>Dynamic drive mode adjustment<br>Activate seat massage<br>Adjust seat position<br>Adjust to average user comfort setting |

-continued

| Emotional Scenario | Data Input | System Interpretation | Output |
|---|---|---|---|
| | Body seating position<br>CAN Data: Passenger seating location | | |
| Tech Detox | Driver Monitoring Camera<br>Analog Microphone Signal<br>Cobalt DSP: In-Cabin Decibel Level<br>CAN Data: Ambient Light Sensor<br>CAN Data: Infotainment Force Touch<br>CAN Data: Decrease in volume level<br>CAN Data: Audio screen in infotainment system<br>External data: Traffic conditions<br>External data: Weather condition | Facial stress detection<br>Voice frequency changes<br>Breathing patterns<br>Slow response to factors<br>Pupils dilated<br>Posture recognition<br>Gesture detection<br>Color temperature of in-vehicle lights<br>Correlation with weather | Countermeasures<br>Scent<br>Music<br>Alternative Route Suggestions<br>Spoken<br>Acceleration- Air purification activated<br>Activation of security system<br>Proactive communication regarding weather, traffic conditions, rest areas, etc.<br>Dynamic drive mode adjustment |
| Do Not Disturb | CAN Data: Passenger seating location<br>Body seating position<br>Driver Monitoring Camera<br>Analog Microphone Signal<br>DSP: Processed Audio Signal<br>CAN Data: Audio volume level<br>CAN Data: Drive mode: comfort<br>CAN Data: In-cabin decibel level<br>CAN Data: Day and Time<br>External data: Weather conditions<br>DSP: External noise pollution | Rate of change against expected norm<br>Frequency<br>Intensity<br>Delta of detected events from typical status | Countermeasures<br>Scent<br>Music<br>Alternative Route Suggestion<br>Spoken<br>Acceleration<br>Activation of security system<br>Proactive communication regarding weather, traffic conditions, rest areas, etc.<br>Dynamic drive mode adjustment |
| Drowsiness | Driver Monitoring Camera<br>Body seating position<br>Analog Microphone Signal<br>DSP: Processed Audio Signal<br>CAN Data: Steering Angle<br>CAN Data: Lane departure<br>CAN Data: Duration of journey<br>CAN Data: Day and Time<br>CAN Data: Road Profile Estimation<br>External data: Weather conditions<br>CAN Data: Audio level | Zonal detection<br>Blink detection<br>Drive Style<br>Steering Style<br>Rate of change against expected norm<br>Frequency<br>Intensity<br>Delta of detected event from typical status | Countermeasures<br>Scent<br>Music<br>Alternative Route Suggestions<br>Spoken<br>Acceleration - Air purification activated<br>Activation of security systems<br>Proactive communication regarding weather, traffic conditions, rest areas, etc.<br>"Shall I open the windows?"<br>Dynamic drive mode adjustment<br>Significant cooling of interior cabin temperature<br>Adapting driving mode to auto mode (detect the bumpy road) |
| Driver Distraction | Driver Monitoring Camera<br>Analog Microphone Signal<br>DSP: Vocal frequency<br>DSP: Processed audio<br>CAN Data: Lane departure<br>CAN Data: MMI Force Touch<br>CAN Data: In-cabin decibel level | Rate of change against expected norm<br>Frequency<br>Intensity<br>Delta of detected events from typical status | Countermeasures<br>Scent<br>Music<br>Alternative Route Suggestions<br>Spoken<br>Acceleration<br>Activation of security systems<br>Proactive communication regarding weather, traffic conditions, rest areas, etc. |

-continued

| Emotional Scenario | Data Input | System Interpretation | Output |
|---|---|---|---|
| | CAN Data: Mobile phone notification and call information<br>External data: Traffic conditions<br>External data: Weather condition | | Dynamic drive mode adjustment |

Current implementations of emotion technology suffer by their reliance on a classical model of Darwinian emotion measurement and classification. One example of this is the wide number of facial coding-only offerings, as facial coding on its own is not necessarily an accurate representation of emotional state. In the facial coding-only model, emotional classification is contingent upon a correlational relationship between the expression and the emotion it represents (for example: a smile always means happy). However, emotions are typically more complex. For example, a driver who is frustrated as a result of heavy traffic may smile or laugh when another vehicle cuts in front of him as an expression of his anger, rather than an expression of happiness. Embodiments of the vehicle experience system 110 take a causation-based approach to biofeedback by contextualizing each data point that paints a more robust view of emotion. These contextualized emotions enable the vehicle experience system 110 to more accurately identify the driver's actual, potentially complex emotional state, and in turn to better control outputs of the vehicle to mitigate or enhance that state.

Figure 7:
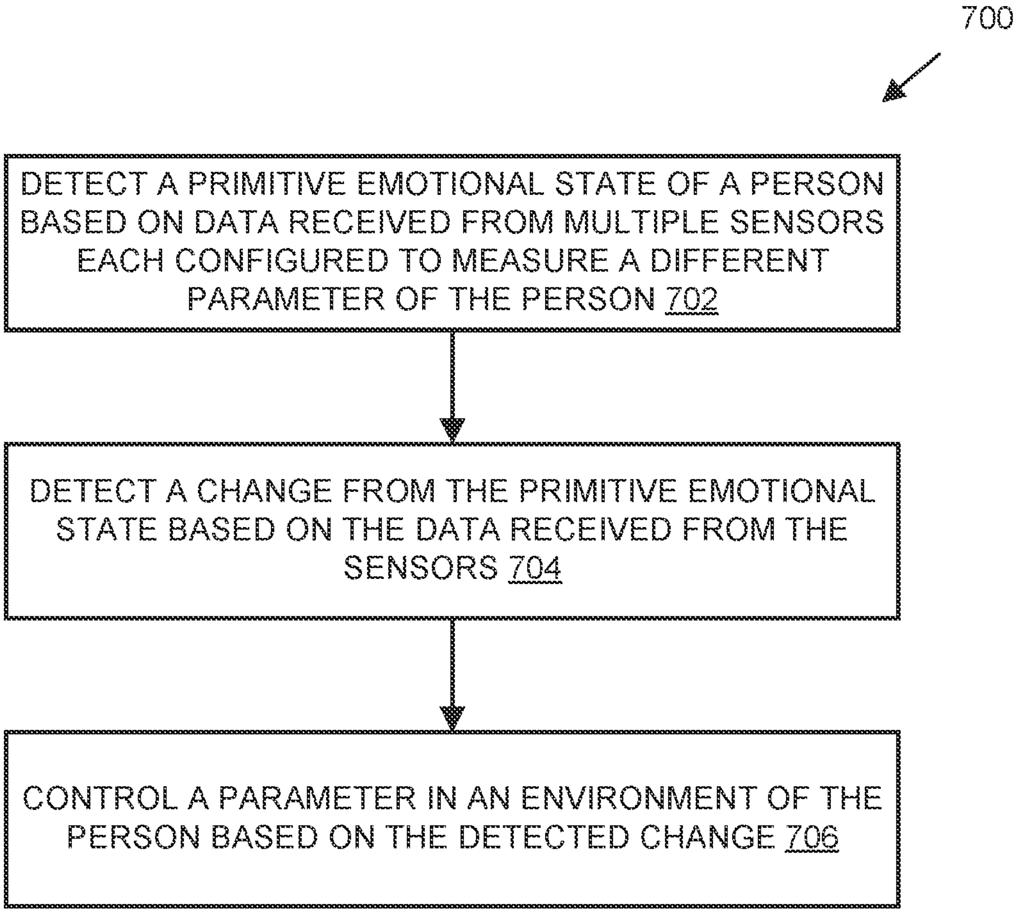
FIG. 7 is a flowchart illustrating another process for detecting an emotional state of a person.

FIG. 7 is a flowchart illustrating another process 700 for detecting an emotional state of a person, according to some embodiments. The process 700 can be performed by the vehicle experience system 110, although the process 700 is not limited to execution in a vehicle. The process 700 can represent a person's emotional state as a comparison to another emotional state. Thus, the emotional state generated by the vehicle experience system 110 using the process 700 may not include an explicit determination, for example, that a driver is stressed, but rather that the driver is exhibiting emotional indications different from those exhibited in the driver's neutral state and that cause the vehicle 100 to implement a stress mitigation response. Other embodiments of the process 700 can include additional, fewer, or different steps than those shown in FIG. 7, for example to include one or more of the steps described with respect to FIG. 6A.

As shown in FIG. 7, the vehicle experience system 110 detects, at step 702, a preliminary emotional state of a person. The preliminary emotional state can, in some cases, be an emotional state measured non-contextually at a first time. In other cases, the preliminary emotional state can be a baseline emotional state. The baseline emotional state can be determined based on data received from multiple sensors in the vehicle 100, each of which is configured to measure a different parameter of the person. The baseline emotional state can represent one or more primitive emotional indications that are determined to correspond to a neutral state of the passenger. The "neutral" state can be determined, for example, based on an amount of time the passenger exhibits the primitive emotional indications, such that a primitive emotional indication exhibited for a greatest amount of time is identified as an indication of the neutral state. Alternatively, the neutral state can be determined by identifying a time the passenger is expected to be in a neutral state, such as a time when traffic and weather are moderate. The primitive emotional indications can be generated as described with respect to FIG. 6A.

At step 704, the vehicle experience system 310 detects a change in the person's emotional state based on the data received from sensors in the vehicle. For example, the vehicle experience system 110 detects one or more primitive emotional indications that are different than the primitive emotional indications associated with the preliminary emotional state. The detected change can, by way of example, be represented as a contextual emotional indication.

Based on the detected change in the person's emotional state, the vehicle experience system 110 controls a parameter in an environment of the person. This parameter can include a lighting configuration in the vehicle that is determined based on the person's emotional state. For example, if a driver is determined to be drowsy, the lighting configuration can be changed to energize the driver. As another example, if a driver is expected to be stressed within the next few minutes based on evaluation of upcoming traffic and historical data indicating that the driver tends to be stressed while driving in heavy traffic, the lighting configuration can be preemptively changed to a calming configuration to help the driver remain calm.

Example Processing System

Figure 8:
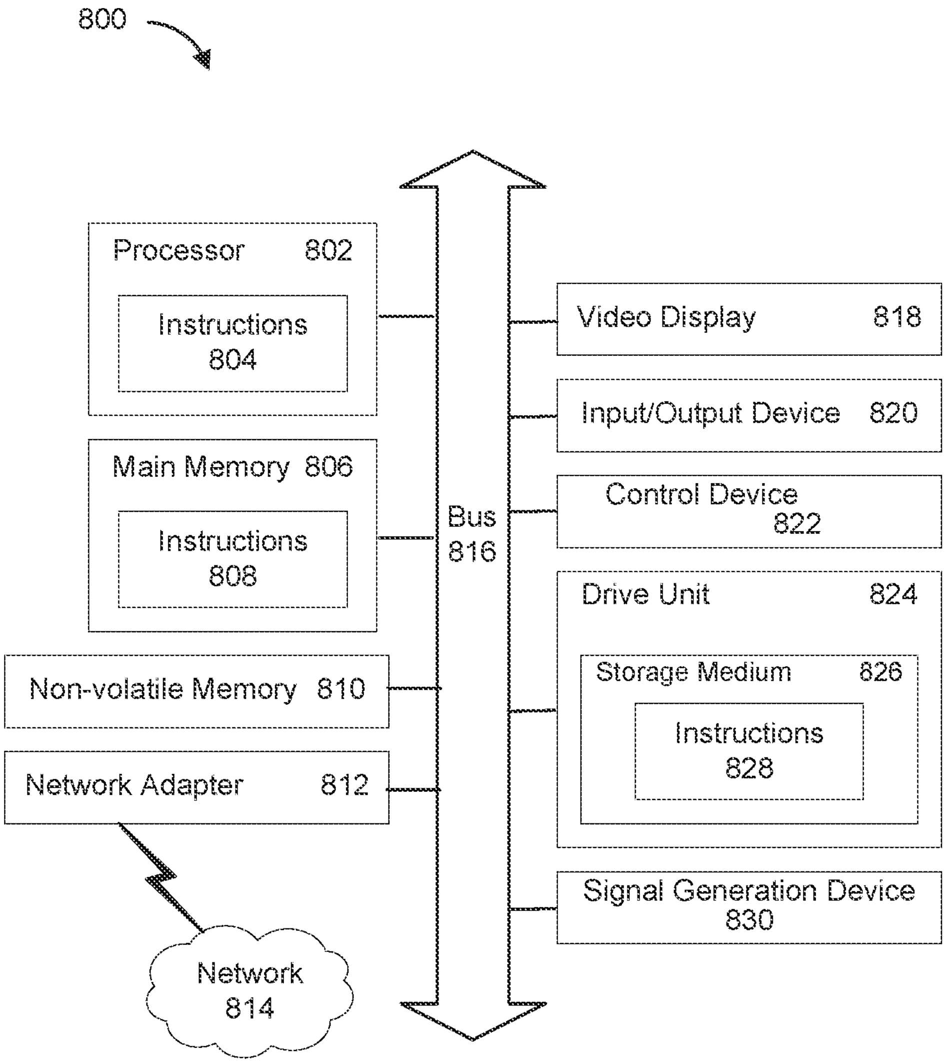
FIG. 8 is a block diagram illustrating an example of a processing system in which at least some operations can be implemented.

FIG. 8 is a block diagram illustrating an example of a processing system 800 in which at least some operations described herein can be implemented. The processing system 800 may include one or more central processing units ("processors") 802, main memory 806, non-volatile memory 810, network adapter 812 (e.g., network interfaces), video display 818, input/output devices 820, control device 822 (e g, keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 894 bus, also called "Firewire."

In various embodiments, the processing system 800 operates as part of a user device, although the processing system 800 may also be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 800.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e. non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention.

The invention claimed is:

1. A vehicle, comprising:

an internal lighting system comprising a plurality of lighting devices, wherein the internal lighting system is configured for outputting multiple different lighting configurations, and wherein each lighting configuration is defined by at least one selected from the group consisting of a brightness of emitted light, a color of emitted light, a number and identity of the plurality of lighting devices that are turned on, a time-based sequence of changes to a color of one or more of the plurality of lighting devices, and a time-based sequence of changes to a brightness of one or more of the plurality of lighting devices;

one or more sensors configured to capture data indicative of a trigger criterion, wherein the trigger criterion comprises one or more contextualized emotional indicators, and the one or more contextualized emotional indicators are generated from a combination of primitive emotional indications, a duration that the primitive emotional indications deviate from a predetermined neutral state, the sensor data, and historical data; and a processor communicatively coupled to the internal lighting system and the one or more sensors, the processor configured to:

cause the internal lighting system to output a first lighting configuration;

detect, based on the data captured by the one or more sensors, the trigger criterion has been satisfied; and modify a configuration of the internal lighting system to output a second lighting configuration in response to detecting the satisfaction of the trigger criterion, wherein the trigger criterion is satisfied when the processor determines that predetermined rules for each of the primitive emotional indications are satisfied by the data captured by the one or more sensors.

2. The vehicle of claim 1, wherein the trigger criterion further comprises an action related to at least one selected from the group consisting of a beginning of an operating session in the vehicle and an end of the operating session in the vehicle.

3. The vehicle of claim 2, wherein the second lighting configuration output in response to the detection of the comprises a signature light pattern identifying the user, a color identifying the user, a signature light pattern identifying a brand associated with the vehicle, and a color identifying the brand associated with the vehicle.

4. The vehicle of claim 1, wherein the trigger criterion further comprises a time-based criterion.

5. The vehicle of claim 1, wherein the trigger criterion further comprises a lighting cue associated with a media content item, and wherein the second lighting configuration is specified by a provider of the media content item.

6. The vehicle of claim 1, wherein the trigger criterion further comprises a context of the vehicle.

7. The vehicle of claim 6, wherein the context of the vehicle comprises at least one selected from the group consisting of a parameter of an environment outside the vehicle, an operating mode of the vehicle, and an activity in which a user is engaged inside the vehicle.

8. The vehicle of claim 1, wherein the trigger criterion further comprises a determination that a user of the vehicle will need to perform an action with respect to operating the vehicle, and wherein the second lighting configuration comprises a lighting alert to notify the user to perform the action.

9. The vehicle of claim 1, wherein the trigger criterion further comprises a measurement indicating a biometric parameter of a user of the vehicle is outside of a specified range.

10. The vehicle of claim 1, wherein the trigger criterion further comprises a detection that a physiological state of a user of the vehicle has transitioned from a first state to a second state.

11. The vehicle of claim 10, wherein the second state indicates the user is fatigued, and wherein the second lighting configuration is selected to mitigate the user's fatigue.

12. The vehicle of claim 10, wherein the user is a driver of the vehicle, wherein detecting the physiological state of the user has transitioned from the first state to the second state comprises detecting a state of attentiveness of the user to driving the vehicle has transitioned from a first state of attentiveness to a second state of attentiveness, and wherein the second lighting configuration comprises a lighting alert to notify the user to refocus on driving the vehicle.

13. The vehicle of claim 1, wherein the trigger criterion further comprises a detection of an emotional state of a user of the vehicle.

14. The vehicle of claim 1, wherein the second lighting configuration comprises a short lighting sequence, and wherein the processor is further configured to restore the configuration of the internal lighting system to the first lighting configuration after outputting the second lighting configuration.

15. The vehicle of claim 1, wherein the trigger criterion is a first trigger criterion during an operating session of the vehicle, and wherein the processor is further configured to:

detect, based on the data captured by the one or more sensors, a second trigger criterion has been satisfied during the operating session;

modify the configuration of the internal lighting system to output a third lighting configuration in response to detecting the satisfaction of the second trigger criterion.

16. The vehicle of claim 1, wherein the one or more sensors comprises at least one selected from the group consisting of a biometric sensor, an interior ambient light sensor, an exterior ambient light sensor, a global positioning sensor, and a sensor capturing information about an environment external to the vehicle.

17. A method comprising:

communicating, by a computing device, with a lighting system in an interior of a vehicle, the lighting system comprising a plurality of lighting devices, wherein the plurality of lighting devices are collectively capable of outputting multiple different lighting configurations in the interior of the vehicle;

while a first lighting configuration is active in the vehicle, receiving, by the computing device, an indication that a trigger criterion has been satisfied, wherein the trigger criterion comprises one or more contextualized emotional indicators generated from a combination of primitive emotional indications, a duration that the primitive emotional indications deviate from a predetermined neutral state, sensor data, and historical data, and wherein the trigger criterion is satisfied when predetermined rules for each of the primitive emotional indications are determined to be satisfied by new data, captured by the or more sensors associated with the vehicle;

applying, by the computing device, a model to select a second lighting configuration, different from the first lighting configuration, in response to the satisfaction of the trigger criterion; and sending, by the computing device, an instruction to the lighting system to cause the lighting system to change from the first lighting configuration to the second lighting configuration.

18. The method of claim 17, wherein the model comprises a rule causing the computing device to select the second lighting configuration in response to the trigger criterion.

19. The method of claim 17, wherein the model comprises a trained machine learning model configured to identify the second lighting configuration in response to the trigger criterion.

20. The method of claim 17, wherein communicating with the lighting system comprises establishing a communication channel between the computing device and the lighting system, the communication channel including at least one selected from the group consisting of direct communication between the computing device and the lighting device, communication through an intermediary vehicle system, and wireless communication through a remote computing device.

* * * * *